United States Patent [19]
Summersgill et al.

[11] Patent Number: 5,985,084
[45] Date of Patent: Nov. 16, 1999

[54] ORGANIC OPTICAL COMPONENTS AND PREPARATION THEREOF

[75] Inventors: Philip Summersgill; Thomas Grierson Harvey; Timothy George Ryan; Neil Carter, all of Cleveland; Andrew John Thorne, Durham, all of United Kingdom

[73] Assignee: Epigem Ltd., Leeds, United Kingdom

[21] Appl. No.: 08/619,717

[22] PCT Filed: Sep. 29, 1994

[86] PCT No.: PCT/GB94/02118

§ 371 Date: May 23, 1996

§ 102(e) Date: May 23, 1996

[87] PCT Pub. No.: WO95/09726

PCT Pub. Date: Apr. 13, 1995

[30] Foreign Application Priority Data

Oct. 1, 1993 [GB] United Kingdom .................. 9320326

[51] Int. Cl.$^6$ .............................. B32B 31/24; B29D 11/00
[52] U.S. Cl. .................................. 156/273.7; 156/275.5; 156/295
[58] Field of Search .................................. 385/131, 129, 385/141, 143, 145; 428/336, 212, 213, 514, 162, 173, 698 ODE, 64.7, 64.9, 65.1; 156/295, 272.2, 273.7, 275.5

[56] References Cited

U.S. PATENT DOCUMENTS

| | | | |
|---|---|---|---|
| 4,148,961 | 4/1979 | Paulus | 428/358 |
| 4,547,040 | 10/1985 | Yamamoto et al. | 385/143 |
| 4,593,974 | 6/1986 | Yamamoto et al. | 350/96.34 |
| 5,136,678 | 8/1992 | Yoshimura | 385/132 |
| 5,171,392 | 12/1992 | Iida et al. | 156/273.3 |
| 5,455,883 | 10/1995 | Shigeta et al. | 385/129 |

FOREIGN PATENT DOCUMENTS

| | | |
|---|---|---|
| 2358970 | 7/1977 | France . |
| 3149907 | 7/1982 | Germany . |

Primary Examiner—Paul Thibodeau
Assistant Examiner—D. Lawrence Tarazano
Attorney, Agent, or Firm—R. William Beard, Jr.; Frohwitter

[57] ABSTRACT

A polymeric wave guide comprises a first layer of a polymer having a first refractive index, and the first layer contains retaining features or groves which will accept a second polymer. A second polymer is curable and is used to fill the retaining features has a refractive index which is greater than the polymer used to produce the first layer. The retaining features of the first polymeric layer are filled with the second polymer by pressing the second polymer into the retaining features by applying an advancing force to a flexible dispensing layer; this results in filling the retaining features and producing a thin over layer having a thickness of less than 1.5 $\mu$m of the second polymer over the surface of the first layer. The method further comprises a step in which the second polymer is cured.

10 Claims, 7 Drawing Sheets

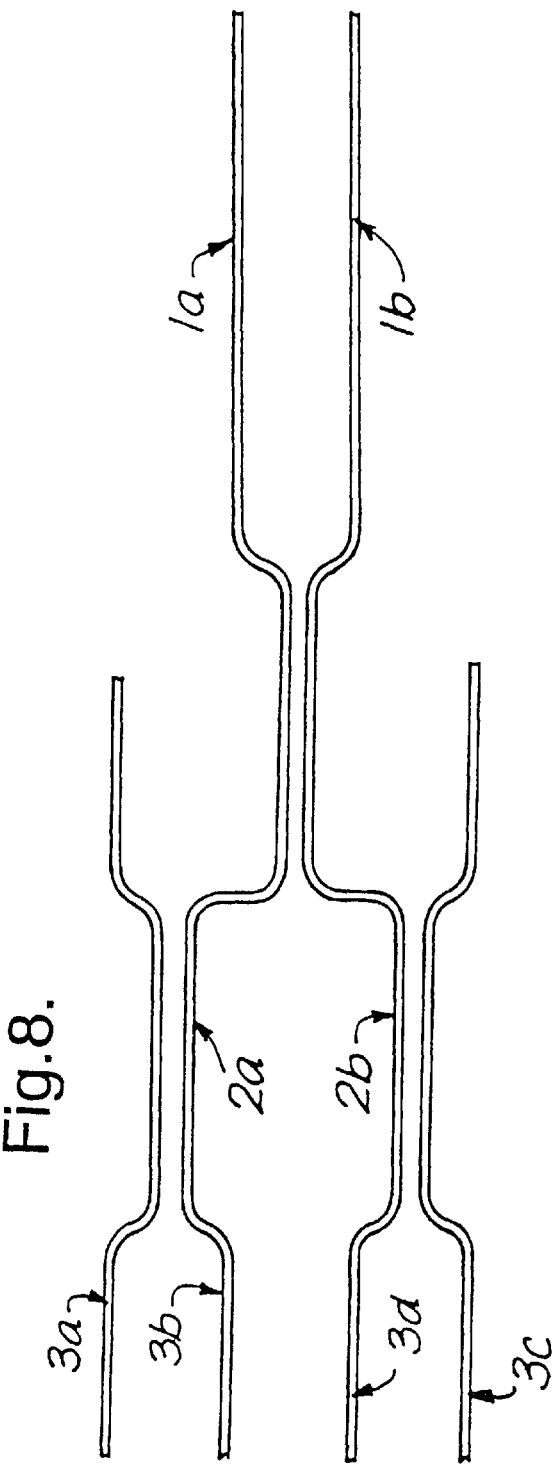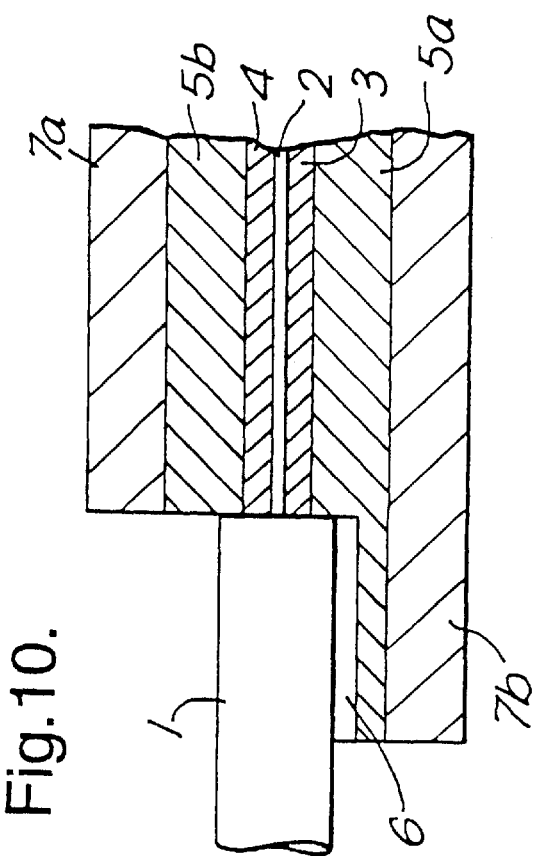

ORGANIC OPTICAL COMPONENTS AND PREPARATION THEREOF

The present invention relates to organic optical components and the preparation thereof.

Optical components may be used to transmit and manipulate light signals in various fields of technology such as telecommunications, data communications, avionic control systems, sensor networks and automotive control systems.

Generally such optical components are classed as either passive or active. Examples of passive optical components are those which provide the, polarisation control, transmission, distribution, splitting, combining, multiplexing and demultiplexing of the light signal. Active optical components include those requiring electrical connections to power and/or control circuitry, such as laser sources and photodiode detectors, and/or to manipulate the light signal using the electro-optic effect, such as provided by certain non-linear optical materials.

It is known to use inorganic materials, such as silica on silicon and ion-exchanges glass, to produce passive optical components. The methods of manufacture of such inorganic passive optical components are based on the lithograhic technologies used in the mass production of semiconductor wafers. However, the subsequent connecting of optical fibres to such components is complex and lengthy and requires the use of active alignment techniques which are increasingly more difficult as the complexity of the components increase.

Inorganic active optical components can be prepared by the combination of active semiconductor materials, such a lithium niobate, into inorganic passive optical components, such as silica. However, the preparation of such active components is difficult such that their occurrence and use is uncommon.

Organic passive optical components comprising polymeric materials are known using direct and indirect lithographic processes. In the indirect lithographic process a master pattern is formed from an organic or inorganic resist material. The master pattern is then replicated by electrodeposition to provide a series of moulds which are then filled with a suitable polymeric material to produce the organic passive optical components.

Organic optical components usually comprise two or more polymers having different refractive indices. The polymer having the higher refractive index when surrounded by the other polymer can function as a wave guide which allows for the transmission and manipulation of a light signal. The higher refractive index polymer is usually introduced into the other polymer as a resin which is then cured. Such a resin needs to be introduced in a precise and controlled manner in order to reduce optical loss from the subsequent waveguide. Hitherto, the processes used in the preparation of such waveguides lead to the formation of a relatively thick and uneven residual layer of resin being present in the organic optical component which when cured results in a relatively thick layer of polymer of variable thinness which gives rise to problems such as unacceptably high optical losses, non-uniform output and inconsistent performance thereby reducing the incentive to use such organic optical components.

It is an object of the present invention to provide an organic optical component having at least one significantly improved characteristic and a method which allows the mass production of such a component.

Accordingly in a first aspect the present invention provides a polymeric structure for use in the preparation of an organic optical component which polymeric structure comprises (a) a first layer of an optically transmissive first polymer having a first refractive index, the first layer having a surface in which is defined at least one retaining feature;

(b) an optically transmissive second polymer retained within the at least one retaining feature, the second polymer having a second reactive index which is greater than the first refractive index; and (c) an overlay of the second polymer having a maximum thickness of less than 1.5 $\mu$m over the surface of the first layer.

In a second aspect of the present invention there is provided an organic optical component comprising:

(a) a first layer of an optically transmissive first polymer having a first refractive index, the first layer having a surface in which is defined at least one retaining feature;

(b) an optically transmissive second polymer retained within the at least one retaining feature, the second polymer having a second refractive index which is greater than the first refractive index; and (c) a second layer of an optically transmissive third polymer having a third refractive index which is less than the second refractive index and which is the same or different from the first refractive index and which second layer contacts the second polymer retained within the at least one retaining feature and the surface of the first layer wherein the organic optical component exhibits an optical loss of less than 2.0 dB.cm−1 at at least one wavelength in the range 300 to 1600 nm.

In a third aspect the present invention there is provided a method of preparing a polymeric structure having (i) a first layer of an optically transmissive first polymer having a first reactive index, the first layer having a surface in which is defined at least one retaining feature;

(ii) an optically transmissive second polymer retained within the at least one retaining feature, the second polymer having a second refractive index which is greater than the first refractive index; and (iii) an overlay of the second polymer having a maximum thickness of less than 1.5 $\mu$m over the surface of the first layer which method comprises (a) forming a line of contact between a flexible dispensing layer and the surface of the first layer and progressively contacting the surface with the flexible dispensing layer such that the line of contact advances across the surface;

(b) applying sufficient of a resin, capable of being cured to form the second polymer and to substantially fill the at least one retaining feature, along the line of contact;

(c) applying sufficient pressure along the line of contact such that (1) substantially all of the resin which is surplus to that required to fill the at least one retaining feature at the line of contact progresses with the advancing line of contact thereby filling the at least one retaining feature with resin; and (2) no more than a quantity of resin capable of forming the overlay of second polymer passes the line of contact; and (d) curing the resin filling the at least one retaining feature.

The first layer may be supported by a suitable substrate which may be subsequently removed from the first layer. Alternatively, the substrate may remain with or is subsequently applied to the first layer thereby providing a laminate structure in which the relatively expensive first layer is of a thickness which is sufficient to provide the desired depth of retaining feature and complementary optical contrast and the substrate provides the desired level of support and may also provide additional positioning features for such items as optical fibres and other optical components. Thus in a preferred embodiment, the first layer is supported by a thicker support layer which posseses positioning grooves which are in alignment with the at least one retaining feature and which grooves are able to receive and locate optical fibres in abutment to the end of each at least one retaining feature. It is particularly preferred that the optical fibres are so located during the application of the second polymer and that sufficient of the second polymer is applied such that a suitable optically correct join is formed between the end of the retaining feature and the abutting end of the optical fibre.

The second layer may also be supported by a suitable, optionally releasable, substrate. Conveniently, the dispensing layer provides the second layer such that the second layer is superimposed upon the surface as a consequence of the advancement of the line of contact. The second layer may also be provided with retaining features in which is retained an optically transmissive polymer, which may be the same as the second polymer and which may be so placed that at least some of the retaining features of the first layer are matched with at least some of the retaining features of the second layer such that they can form a composite optical component.

The optically transmissive polymers may be selected from those known in the art including those developed as light curable adhesives for joining optical components for example those sold under the LUXTRAK (LUXTRAK is a tradename of Zeneca plc), those developed for polymer optical fibre fabrication and those developed for optical recording using polymer photoresists.

In particular the optically transmissive second polymer may be formed from a suitable resin for example halogenated and deuterated siloxanes, acrylates and methacrylates such as ethyleneglycol dimethacrylate, tetrafluoropropylmethacrylate, pentafluorophenylmethacrylate, tetrachloroethylacrylate, multifunctional derivatives of triazine and phosphazene. Resins and polymers that contain highly fluorinated aliphatic and aromatic moieties, particularly those capable of being formed into cross-linked or covalent networks, are preferred. Additionally the second polymer may comprise a resin or polymer formulation that provides a non-linear optical (NLO) property such as described in European patent application EP-474402-A, second order NLO properties, third order NLO properties or signal amplification properties.

The optically transmissive first polymer in which the retaining feature is formed may be prepared from curable resins or can be fabricated from halogenated and deuterated polymers such as polymethylmethacrylate, polyobornate, polystyrene and polyimides.

Suitably for the preparation of monomodal organic optical components, in particular those in which the retaining features have a height and a width from 5 to 10 $\mu$m, the difference between the second refractive index and the first refractive index is from 0.001 and 0.02, preferably from 0.002 and 0.01 and particularly from 0.004 and 0.007, i.e. the difference is from 0.05 to 1.5% of the first refractive index. Where the retaining features have a height and a width from 1 to 5 $\mu$m, and in which instance the reduction in the thickness of the overlay is even mere advantageous, it is preferred that the difference in refractive index is from 1 to 30%, particularly 1 to 20%, ad especially 1 to 5% of the first refractive index.

Preferably, the second polymer has a refractive index from 1.4 and 1.7, for example from 1.43 and 1.5, and particularly from 1.45 and 1.46 at the wavelength of light used in the organic optical component. Where the optical component is multimodal it is preferred that the refractive index of the second polymer is from 1.5 to 1.7 and preferably about 1.6, for example 1.6 to 1.65.

Where the second polymer is coupled to the end of an optical fibre it is preferred that the second polymer has a refractive index which closely matches that of the optical fiber. In such circumstances it is also preferred to select a second polymer which shows good intrinsic adhesion to the optical fibre which is principally formed from silica.

The refractive index of the polymers may be modified by the inclusion of suitable additives into the polymer, in particular mixtures of those polymers mentioned above may be used to achieve a desired refractive index. Where the major component of the second polymer is bis(oxy ethyl methacrylate) 2,2',3,3',4,4' hexafluoroglutarate, it is particularly preferred that the refractive index of the second polymer is adjusted by adding appropriate amounts of ethylene glycol dimethacrylate which can increase the refractive index (as measured at 1.32 or 1.55 $\mu$m) by an absolute value in excess of 0.02 when added at a level of 30% by weight.

The overlay of the second polymer has a maximum thickness of less than 1.5 $\mu$m, preferably less than 1 $\mu$m, and particularly less than 0.5 $\mu$m over the surface of the first layer. The average thickness of the overlay is preferably less than 1 $\mu$m and particularly less than 0.5 $\mu$m. The variation of the thickness of the overlay across the surface is preferably less than ±0.75 $\mu$m, particularly less than ±0.5 $\mu$m and especially less than ±0.25 $\mu$m. When formed into an organic optical component the component will exhibit an optical loss of less than 20 dB.cm$^{-1}$, preferably less then 1.0 dB.cm$^{-1}$ and particularly less than 0.5 dB.cm$^{-1}$.

The at least one retaining feat is conveniently in the form of a channel, and typically is of a generally trapezoidal cross-section although other configurations are possible, for example rectangular, square or semi-circular. As stated above, for a monomodal organic optical device, the height and width of a retaining feature may be in the range 1 to 10 $\mu$m depending on the difference in refractive index used. However, preferably the height and width of the retaining features are in the range 5 to 10 $\mu$m, and particularly in the range 6 to 8 $\mu$m. Preferably the maximum width of the remaining feature is at the surface of the first layer. Typically, the ratio of the maximum width to minimum width is less than 2:1 and is preferably about 1:1. The retaining feature may be formed by any suitable technique for example a lithographic etching process such as reactive ion etching through a suitable mask although molding or embossing is preferred. Where the organic optical device is to be used as a multimodal device then similar fabrication techniques can be used with suitable adaptation of the dimensions and selection of materials, usually though the height and width of the retaining features when employed in a multimodal device are in the range 10 to 100 $\mu$m, for example 10 to 50 $\mu$m and consequently the presence of an overlay is less of a problem than in the case of a monomodal device.

In order to facilitate the curing of the resin it is preferred to use an initiator, for example a thermal and/or photoinitiator and particularly an initiator which does not absorb light at the operating wave length of the organic optical component. Typically, when used, an initiator is present in the resin at a concentration from 0.1 to 3.0% by weight, and preferably from 0.5 to 2.0% by weight. Suitable photoinitiators include 2-methyl-1-[4-(methylthio)phenyl)-2-morpholino propanone-1 (Irgacure 907), 1-hydroxy-cyclohexyl-phenyl ketone (Irgacure 184), isopropylthioxanthone (Quantacure ITX), Camphorquinone/dimethylaminoethylmethacrylate. Similarly a suitable thermal initiator is tert-butylperoxy-2-ethyl hexanoate (Interox TBPEH).

As the line of contact moves across the surface of the first layer the resin is effectively pushed across the surface and flows into the at least one retaining feature. The rate at which the line of contact advances across the surface will depend, amongst other things, on the characteristic of the resin. Typically, the resin has a viscosity from 0.1 to 100 poise and more typically from 10 to 100 poise. Preferably the line of contact is moved along the length of the retaining feature, particularly when the retaining feature has a width or height greater than 10 μm, thereby improving the filling of the retaining feature and reducing the possibility of inclusion of gas bubbles.

The resin may be fully retained within a retaining feature as the line of contact moves from the retaining feature, in which case the resin may be cured at any convenient subsequent time. However, the resin may often show some degree of resilience in the non-cured form in which case as the line of contact moves from the retaining feature the resin therein will tend to relax and stand proud of the retaining feature thereby reducing the effectiveness of any optical component subsequently formed the polymeric structure. To counter the relaxation of the resin it is preferred that the resin is cured whilst the line of contact passes over it. Conveniently and preferably therefore, the resin contains a photoinitiator which is activated by a particular wavelength of light, particularly UV light. A suitable source of light may then used to cure the resin before pressure applied along the line of contact is release and before the resin relaxes from the retaining feature. It is especially preferred that the dispensing layer is transparent to the light used and that the light is shone through the dispensing layer towards the resin. In order to focus the light substantially at the tip and thereby avoiding, for example, premature of the resin, the angle of incidence of the light onto the line of contact may be required to be adjusted from polymer to polymer. Alternatively, for a given angle of incidence and where the first layer is at least partially transmissive to the light, the first layer may be chosen to have a thickness such that the internal refraction of the incident light acts to focus the light at the line of contact. Additionally, where the first layer is at least partially transmissive to the light and is of a suitable thickness, a mirrored support may be positioned under the first layer thereby causing the transmitted light to be reflected back to the line of contact.

The pressure is applied along the line of contact by any suitable means. Suitably, the pressure is applied using a roller under a compressive load which may thus on rotation retain the resin in the nip formed by the roller between the buffer layer and the surface. It is therefore preferred that the resin is cured at the nip as the line of contact progresses across the surface.

BRIEF DESCRIPTION OF THE DRAWINGS

The present invention is illustrated by reference to the following figures.

FIG. 8 shows an additional optical device capable of being formed by the process of the present invention.

FIG. 10 shows the positioning of an optical fibre within an optical device capable of being formed by the process of the invention.

In FIG. 1, a first layer (2) is supported on a substrate layer (1) which is held in position by a vacuum bed (4). The first layer (2) has retaining features (3) in the form of channels. A resin dispenser (5) provides a supply of resin (6) containing a photoinitiator to the line of contact formed between the first layer (2) and a second layer (7) supported on a substrate layer (8). The roller (9) applies a pressure along the line of contact and moves in the direction indicated by the arrow (A). The resin is thus squeezed across the surface of the first layer (2) by the action of the roller and into the retaining features (3) thereby only leaving a very small residual overlay of the resin between the second layer (7) which is superimposed over the first layer (2). As the resin filled retaining features pass through the nip of the roller, UV light from the source (10) irradiates the resin and initiates the curing of the resin.

FIG. 2 is an optical device which has a wave guide a so-called "Y" junction or splitter in which light is directed along the stem of the Y and is split between the two branches.

FIG. 3 shows a graphical representation of the intensity of the light signal as emitted from the branched end of the optical device as prepared in Example 1. The major peaks represent the light emitted from the actual branches of the "Y" junction. The absence of other peaks show that the optical device is able to retain substantially all of the light signal within the wave guide, i.e. there is little or no overlay present.

FIG. 4 is a similar graphical representation as that of FIG. 3 except that the "Y" junction was that prepared in Example 2. As before, the major peaks represent the light emitted from the actual branches of the "Y" junction. However, the presence of a substantial overlay allows leakage of the light signal from the wave guide which can be seen by the large number of minor peaks to either side of each major peak.

FIG. 5 shows a cross-section of the optical device as prepared in Example 1 comprising a first layer (1a) having embossed, and filled, retaining features (2) and a second layer (1b). As is evident there is little or no discernible overlay present.

FIG. 6 shows a cross-section of the optical device as prepared in Example 2 comprising a first layer (1a) having embossed, and filled retaining features (2) and a second layer (1b). Between the first layer (1a) and second layer (1b) there is an interposing, overlay (3).

FIG. 7 shows a graphical representation of the intensity of the light signal as emitted from the branched end of the optical device as prepared in Example 7. The major peaks represent the light emitted from the actual branches of the 1×8 passive splitter. The absence of other peaks shows that the optical device is able to retain substantially all of the light signal within the wave guide.

FIG. 8 is an optical component known as a 2×4 splitter. An incoming light signal from one or other of stems (1a, 1b) is progressively split into two signals along branches (2a, 2b) and thereafter four signals along braches (3a, 3b, 3c, 3d).

FIG. 9 shows a graphical representation of the intensity of the light signal as emitted from the ends of branches (3a, 3b, 3c, 3d) of the 2×4 splitter as shown in FIG. 8 and fabricated according to the process of the present invention. The major peaks represent the light emitted from the ends of the branches. The absence of other peaks show that the optical device is able to retain substantially all of the light signal within the wave guide, i.e. there is little or no overlay present. The signal from each of the branches was within 0.1 dB of each other.

FIG. 10 shows how an optical fibre (1) may be abutted against a retaining feature (2) which has been filled with the second polymer. The retaining feature (2) is located within a first layer (3) over which has been applied further first polymer to form a second layer (4), the first layer (3) is supported by a substrate (5a) in which is formed a positioning feature (6), e.g. a "V" groove in which the optical fibre (1) is located. Further supporting layer (5b, 7a, 7b) are also provided.

Figure 1:
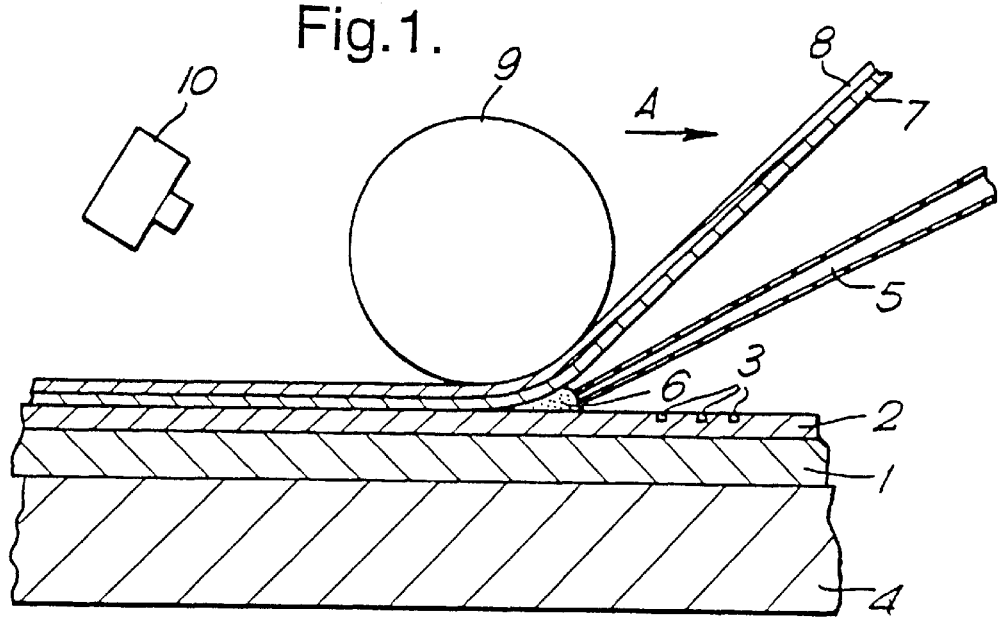
FIG. 1 shows a schematic diagram of an organic optical component being formed according to the process of the present invention.

The invention is also illustrated by the following examples.

Formulation A

This formulation was used to prepare the first polymer in which the at least one retaining feature was formed. The formulation contained
100 parts by wt. of bis(oxy ethyl methacrylate) 2,2',3,3',4,4' hexafluoroglutarate (HFG)
2 parts by wt. of "IRGACURE 651" (Ciba-Geigy)
1 part by wt. tert-butylperoxy-2-ethyl hexanoate ("INTEROX TBEH", Interox Chemicals Ltd).

The viscosity of the formulation was measured to be 0.4 Poise using a Carrimed rheometer.

When spin coated to a thickness of 10 μm onto a high refractive index substrate a fully cured optical coating of Formulation A had a refractive index of 1.449 obtained using the critical angle method.

Formulation B

This formulation was used as the resin from which the retained second polymer was formed. The formulation contained
75 by wt. of HFG
25 parts by wt. of 1,3,5 tris(oxy ethyl methacrylate) triazine
2 parts by wt. of "IRGACURE 651"
1 part by wt. of "INTEROX TBPEH".
The formulation viscosity was 0.8 Poise.

Using the method described for Formulation A, Formulation B provided an optical coating with a refractive index of 1.466.

Formulation C

This formulation was used as an alternative to Formulation B. The formulation contained
92.5 parts by wt. of HFG
7.5 parts by wt. of ethylene glycol dimethacrylate
2 parts by wt. of "IRGACURE 651"
1 part by wt. of "INTEROX TBPEH"

The formulation viscosity was the same as that of Formulation A. The refractive index was 1.4623 at 1.32 μm and 1.4605 at 1.55 μm.

Formulation D

This formulation was based on Formulation B except that 5 parts by wt. of a viscosity modifying polymer of the general formula

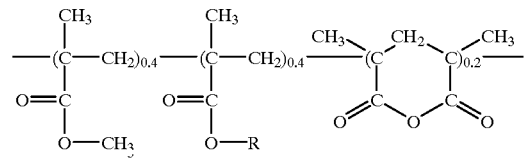

where R is ethyl acrylate was added.

The formulation viscosity was 1.3 Poise.

Formulation E

This formulation contained
100 parts by wt. of an aliphatic polyester acrylate ("Photomer 5018", Harcros Chemicals)
2 parts by wt. of "IRGACURE 651"
1 part by wt. of "INTEROX TBPEH".

The formulation had a viscosity 25° C. of between 7 to 12 Poise and a refractive index (when cured) of 1.488 at 633 nm (Formulation A which had a refractive index of 1.4638 at 633 nm)

Formulation F

This formulation contained
75 parts by wt. of HFG
25 parts by wt. of ethylene glycol dimethacrylate
2 parts by wt. of "IRGACURE 651"
1 part by wt. of "INTEROX TBPEH".

The viscosity of this formulation was similar to that of Formulation A and had a refractive index (when cured) of 1.4734 at 633 nm.

EXAMPLE 1

A flexible substrate comprising polyethylene terephthalate film (Melinex grade 506—Melinex is a tradename of Imperial Chemical Industries plc), 100 μm nominal thickness, was coated with Formulation A (50 μm wet coat thickness) using a No. 5K bar coater and partially UV cured using a Fusion Systems. UV lamp type LXF300, fitted with a type D bulb model No. 1787 emitting in the range 200–880 nm with maximum output at 365 nm, providing 118 W.cm-1 at the focal point.

Retaining features, in the form of channels, were then embossed into the partially cured film which was then further cured at 20° C. using the "Fusion Systems" IV source to form a first layer.

Figure 2:
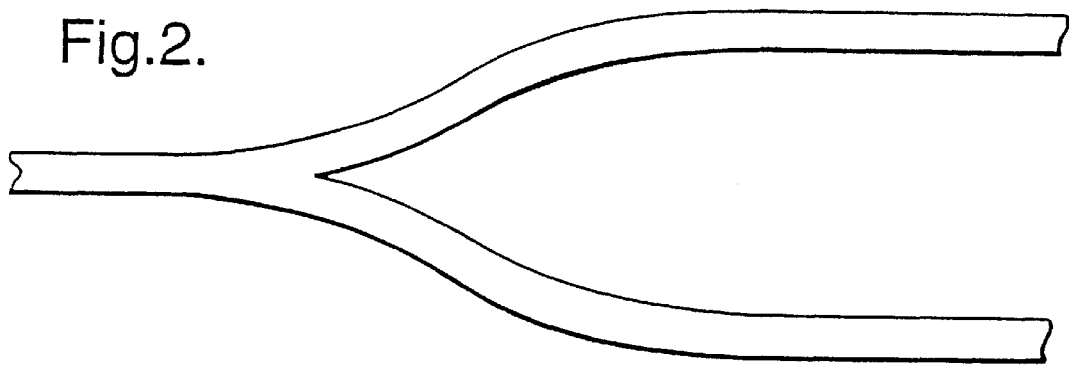
FIG. 2 shows an optical device capable of being formed by the process of the present invention.

The reining features were generally of a square cross-section (7.5 μm by 7.5 μm) in the form of a "Y" junction. The configuration of the "Y" junction is that shown in FIG. 2 wherein the two arms join the stem of the Y as "S" bends of curve radius 150 mm. Each of the arms and stem were of 40 mm in length.

The first layer was transferred to a table and held in position using a vacuum bed to form a supported film. The table was provided with a laminating roller (70 mm outside diameter including a 10 mm silicone rubber sleeve, width 64.5 mm) and a UV lamp (GEW serial No. 8428, type MD2-10 fitted with a type 708A.FCD lamp providing the same output and wavelength range as the Fusion Systems lamp above). Both the laminating roller and the UV lamp were able to traverse the length of supported film.

A line of contact was formed between a flexible dispensing layer of Melinex 400 film and the supported film. The UV lamp was positioned and the light therefrom focused (using a parabolic lens) such that illumination at a level of 120 W.cm−1 occurred along the line of contact. The laminating roller was positioned along the line of contact and a load of 68 kg applied to the roller.

The laminating roller and the UV lamp traversed the length of the supported film at a rate of 0.5 m.s−1 such that an area of supported film of 65 mm by 65 mm was covered and during which time 0.2 g of resin of Formulation B was dispensed using a pipette to the line of contact between the first and second film.

The resin was thus squeezed across the surface of the supported film by the action of the roller thereby filling the retaining features and leaving only a small residual overlay of cured Formulation B between the laminated supported film and the dispensing film. The conditions of the experiment were therefore such that the time for cure of the resin in the retaining feature approximated to the residence time of the laminated films in the nip of the laminating roller.

The dispensing layer was readily delaminated from the residual overlay. The overlay was then coated with a 50 $\mu$m thick layer of Formulation A which was then partially UV cured using the GEW UV source. Fabrication was then completed by laminating a substrate of Melinex 505 film onto the partially cured layer of Formulation A which was then fully UV cured to produce a laminated product. The laminated product was then baked in an oven at 80° C. for 18 hours before testing.

A sample of filled retaining feature was cut out of the baked laminated product and sectioned using a microtome. The thickness of the overlay in the microtomed sample was measured by optical microscopy to be 0.25+−0.20 $\mu$m. The cross-sectional dimensions were also measured to be depth 7.5 $\mu$m width at surface of first layer 7.4 $\mu$m width at bottom of channel 7.1 $\mu$m.

The effective refractive index difference between the cured Formulation B in the retaining feature and the surrounding region was determined to be 0.007.

The "Y" shaped waveguides this formed were prepared for optical characterisation by sandwiching them between two glass slides and microtoming the ends such that the end faces were perpendicular.

EXAMPLE 2

Comparative

The procedure of Example 1 was repeated except the UV curing of the resin in the retaining feature was performed using a lower intensity UV source (Model B-100A Blak Ray Ultraviolet lamp, UVP Inc. with 1.0 mW.cm−2 at 38 cm from the source) that was not directed along the line of contact. Therefore, in this example the reduced power of the UV light resulted in the curing time being less than the residence time at the nip with a consequential leakage of the resin from the retaining feature so as to form a thicker overlay.

The overlay thickness was measured subsequently determined and found to vary in the range 1.5 to 3.0 $\mu$m.

The wave guides formed in Example 1 and Example 2 were characterised using fibre coupling techniques using "pigtailed" laser diodes having wavelengths of around 1.3 and 1.55 $\mu$m (Northern Telecom LC71-18 (1.32 $\mu$m) and LC81-18 (1.552 $\mu$m)).

The output from the lasers was transmitted via a standard 9/125 $\mu$m silica monomode optical fibre, the end face of which was prepared using a standard fibre cleaving technique.

A sandwiched waveguide of Example 1 was mounted on a 4-axis manipulator stage (Photon Control DM2), whilst the end of the optical fibre was mounted on an adjacent manipulator black (Photon Control Microblock). The end of the optical fibre was then brought into alignment with the input face of the "Y" shaped waveguide.

The laser light was then coupled into the wave guide through a 2 to 10 mm wide air gap and was transmitted along the waveguide to the relevant output face. The light emitted from the output face was imaged using a microscope objective lens onto the sensing element of a vidicon camera (Electrophysics Micronviewer 7290). The lens was also mounted on a manipulator block in order to allow the appropriate section of the output face to be viewed.

The image received by the vidicon was inputted into an image capture board (Synoptics Synapse 768) mounted in a Nectar 486 computer running an image analysis programme (PC Image Plus, Foster Findlay Associates). The programme allows the relative intensities of different sections of the received image to be measured and plotted.

Figure 3:
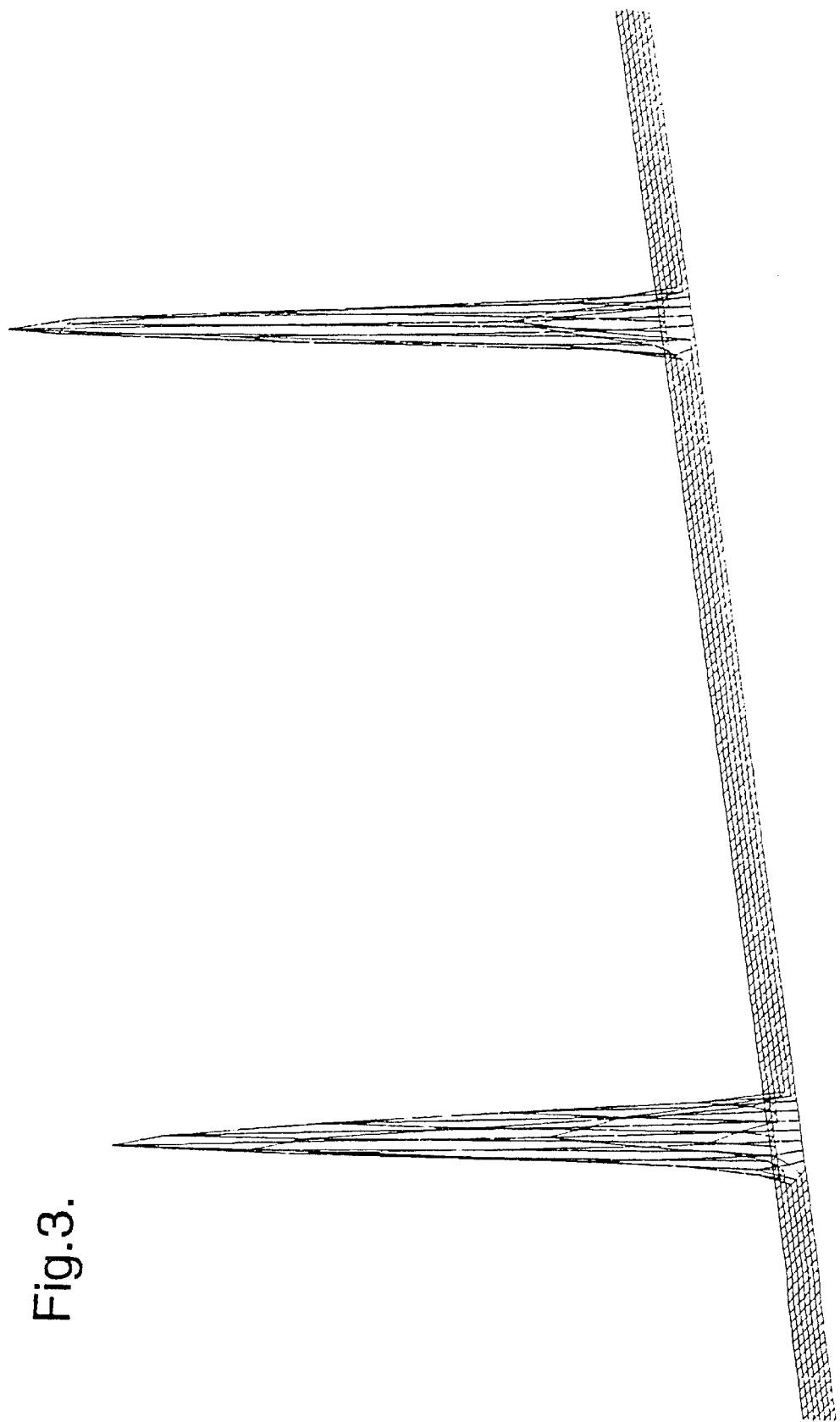
FIG. 3 shows an analysis of the output of the optical device formed in Example 1.

The output from the two arms of the "Y" shaped wave guide is shown in FIG. 3. The confinement of the light centred on the regions of the retaining features is clear. No significant light intensity is seen in the region between the two output peaks and the contrast ratio (as determined by the maximum intensity of the peaks divided by the maximum intensity between the peaks is in excess of 1000). Thus, little light is emitted from the overlay of the cured Formulation B resin.

In a further example, a straight waveguide prepared according to Example 1 showed a similar contrast ratio.

Figure 4:
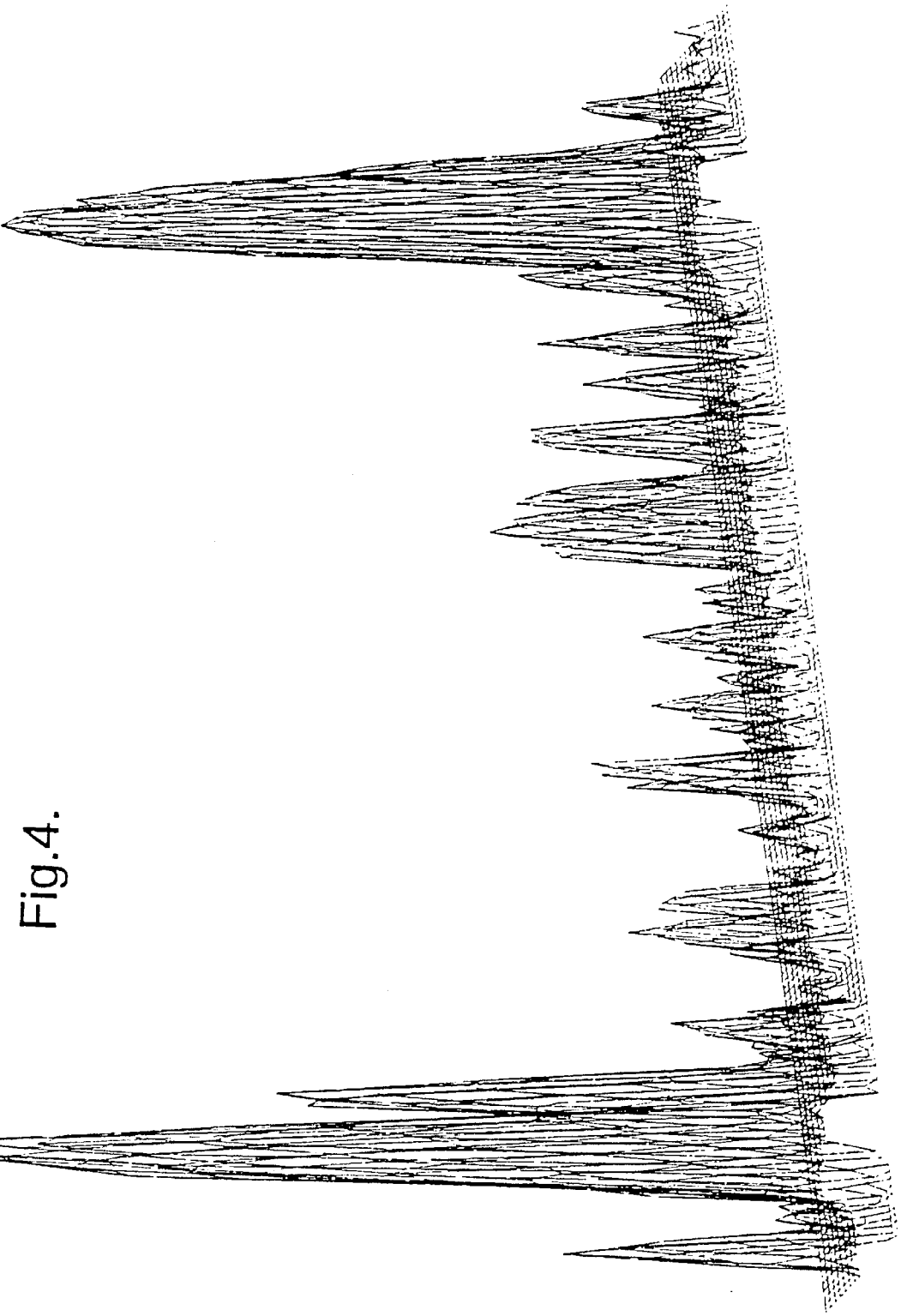
FIG. 4 shows an analysis of the output of the optical device formed in Example 2.
Figure 5:
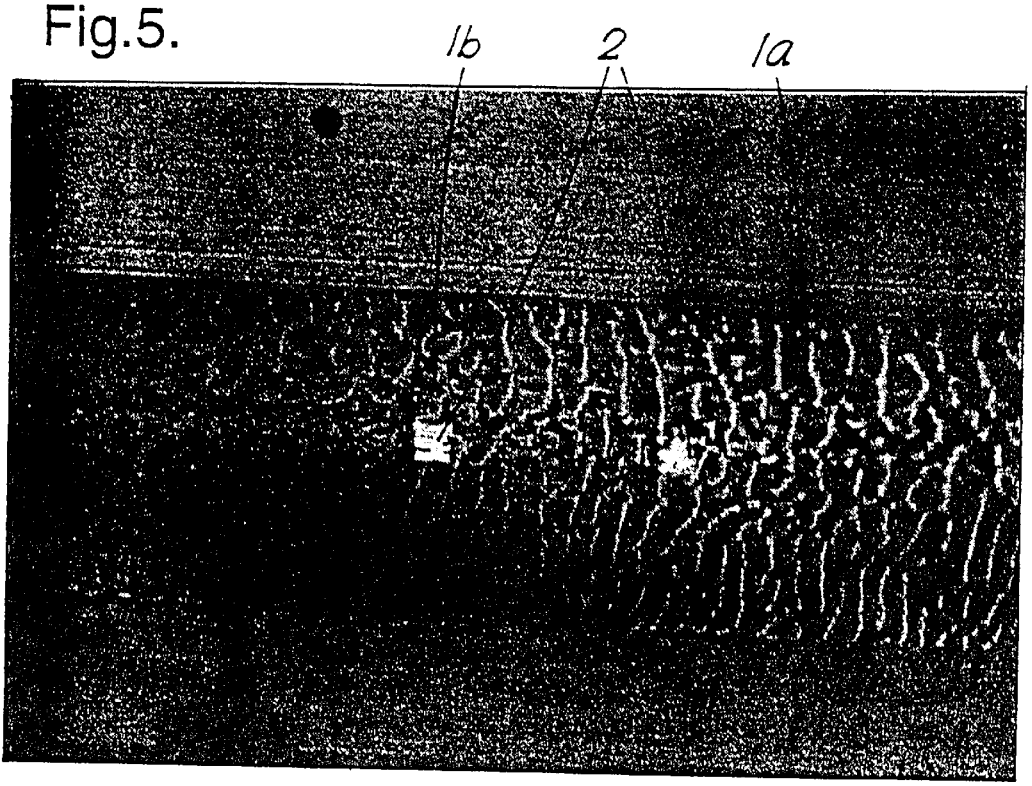
FIG. 5 is a cross-section of the branched end of the device formed in Example 1.
Figure 6:
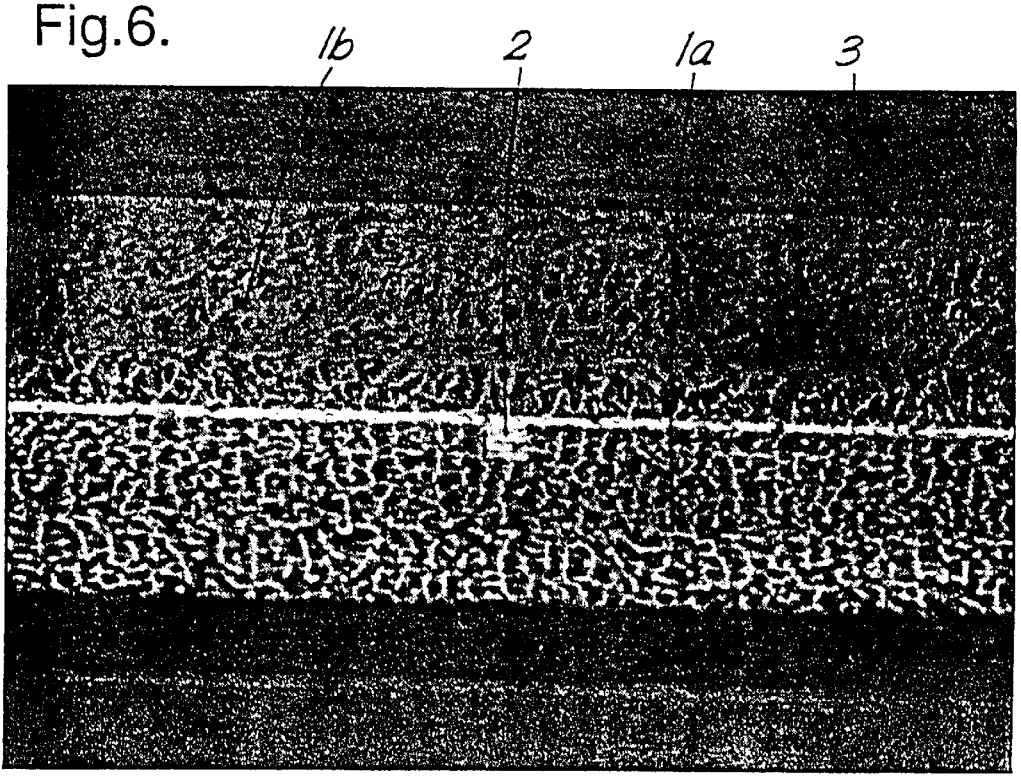
FIG. 6 is a cross-section of the stem end of the device formed in Example 2.

In comparison, FIG. 4 shows the results of characterising the "Y" shaped waveguide prepared according to Example 2. The contrast ratio of about 7 is principally due to the thicker overlay. Straight waveguide produced according to Example 2 also showed a reduced contrast ratio of between 5 to 100.

EXAMPLE 3

Example 1 was repeated except that Formulation C was used instead of Formulation B. The resulting laminated product had a similar thickness and variation in this to that of Example 1.

EXAMPLE 4

Comparative

Example 2 was repeated except that Formulation D was used instead of Formulation B. The filling of the retaining features was as described in Example 2. The resin in the retaining features was cured after the line of contact had passed over the filled portion of the retaining feature, thereby allowing the retained resin to partially relax out of the retaining feature, this resulted in the formation of a very large overlay.

EXAMPLE 5

Example 1 was repeated except that Formulation E was used instead of Formulation B. An overly comparable to that described in Example 1 was generated.

EXAMPLE 6 (a), (b) AND (c)

Example 1 was repeated except that a multimode optical device was prepared comprising channels of 28 $\mu$m depth and of between 60 to 60 $\mu$m width. In Example 6 (a), Formulation B was replaced by a resin comprising an epoxylated bis phenol A diacrylate having a refractive index of 1.5562 at 633 nm. In examples 6 (b) and 6 (c) Formulations E and F replaced Formulation B respectively.

In each of Example 6 (a), (b) and (c) an overlay comparable to that of Example 1 was produced.

EXAMPLE 7

Figure 7:
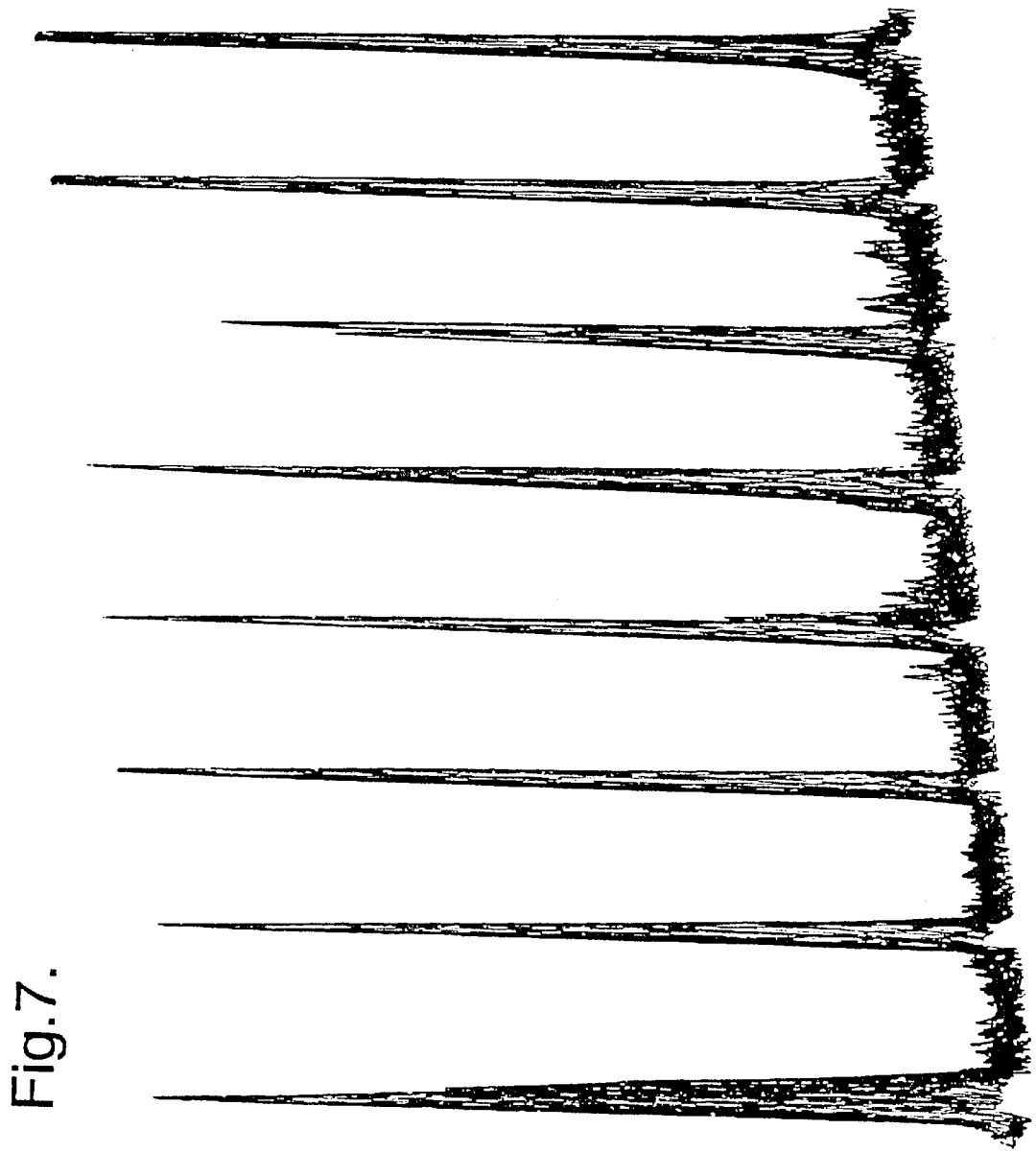
FIG. 7 shows an analysis of the output of the optical device formed in Example 7.
Figure 9:
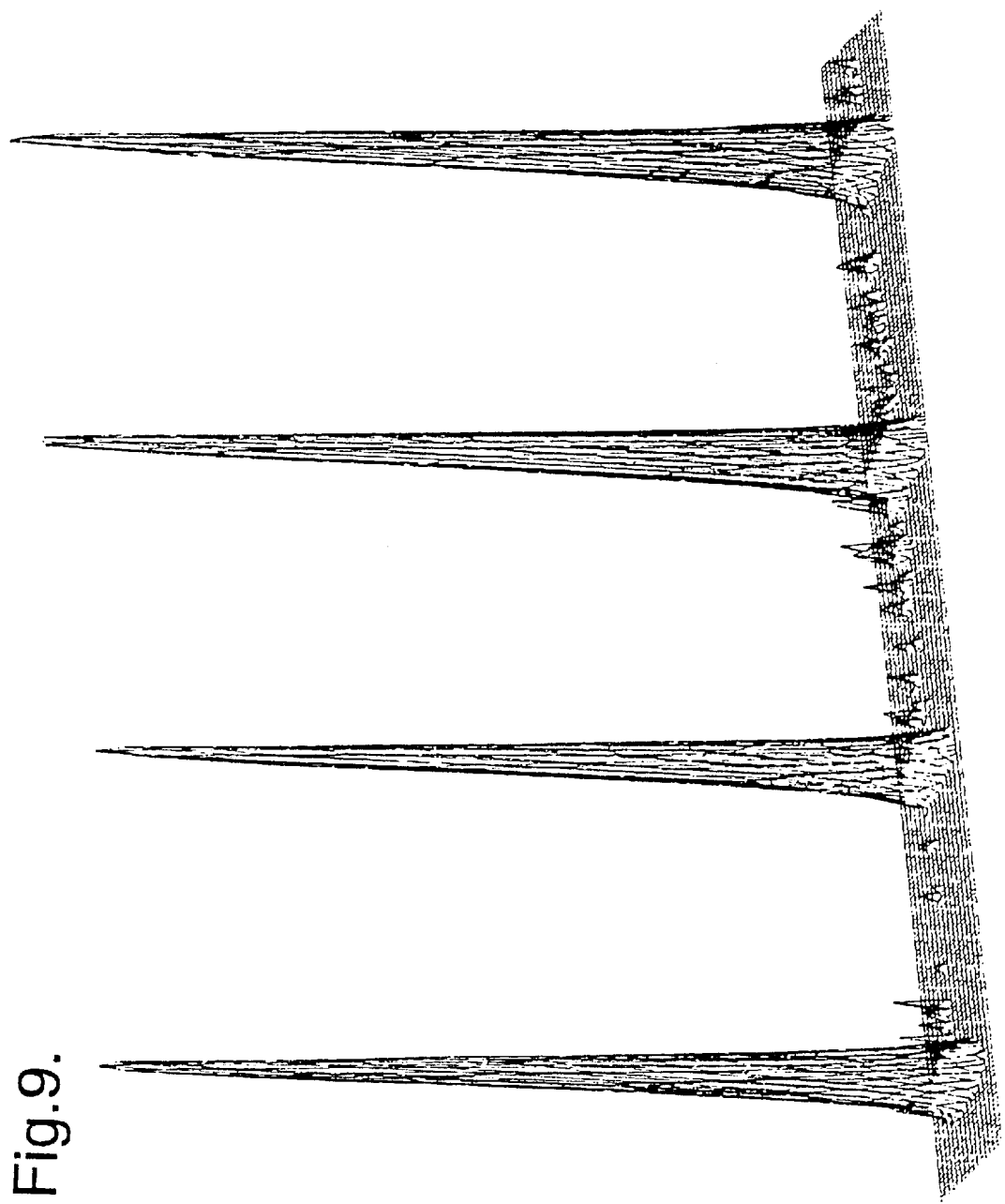
FIG. 9 shows an analysis of the output of the optical device as shown in FIG. 8.

Example 1 was repeated except that a 1×8 passive splitter was formed and Formulation B was replaced by a resin comprising 90 parts by wt. of HFG and 10 parts by wt. of ethylene glycol dimethacrylate. An analysis comparable to that performed for Examples 1 and 2 was conducted and the results are as shown in FIG. 7. The best total loss for the configuration was 16.6+/−1.6 dB with an average loss of 17.3+/−2.7 dB.

We claim:

1. A method for preparing a polymeric optical waveguide structures, which polymeric structure has
    (i) a first layer of an optically transmissive first polymer having a first refractive index, the first layer having a surface in which is defined at least one retaining feature adapted to retain a polymer therein;
    (ii) a retention layer of an optically transmissive second polymer retained within the at least one retaining feature, the second polymer having a second refractive index which is greater than the first refractive index,
    (iii) an overlay of the second polymer over the first layer adjacent the at least one retaining feature, the overlay having a maximum thickness of less than 1.5 $\mu$m over the surface of the first layer, and
    (iv) a flexible dispensing layer adjacent the surface of the first layer, wherein the overlay is between the flexible dispensing layer and the surface of the first layer,
    said method comprising:
    (a) forming a line of contact between the flexible dispensing layer and the surface of the first layer and progressively contacting the surface with the flexible dispensing layer such that the line of contact advances across the surface;
    (b) applying a sufficient amount of a resin between the flexible dispensing layer and the first layer along the line of contact, wherein the resin is capable of being cured to form the second polymer to substantially fill the at least one retaining feature;
    (c) applying sufficient pressure along the line of contact such that
        (1) substantially all of the resin which is surplus to that required to fill the at least one retaining feature at the line of contact progresses with the advancing line of contact thereby fillling the at least one retaining feature with resin, and
        (2) no more than a quantity of resin capable of forming the overlay of second polymer passes the line of contact and such that the resulting overlay has said thickness of less than 1.5 $\mu$m over the surface of the first layer; and
    (d) curing the resin filling the at least one retaining feature.

2. A method as claimed in claim 1, wherein said applying sufficient pressure along the line of contact is done simultaneously with said curing the resin filling the at least one retaining feature, wherein said curing is at the line of contact of said applying sufficient pressure.

3. A method as in claim 1 wherein said curing the resin filling the at least one retaining feature is by light, said flexible dispensing layer being transparent to said light, said light being shone through the flexible dispensing layer onto the resin at a predetermined angle of incidence of the light onto the line of contact.

4. A method as in claim 1, wherein at least one dimension of the at least one retaining feature is less than 100 $\mu$m.

5. A method as in claim 1, wherein the second polymer is formed from a resin selected from the group consisting of siloxanes, acrylates and methacrylates, multifunctional derivatives and mixtures thereof.

6. A method as in claim 1, wherein the first and second polymers are formed from a resin derived from one or more monomers selected from the group consisting of ethyleneglycol dimethacrylate, tetrafluoropropylmethacrylate, pentafluorophenylmethacrylate, tetrachloroethylacrylate, bis (oxyethyl methacrylate) hexafluoroglutarate, tris (oxyethyl methacrylate) triazine, and mixtures thereof.

7. A method as in claim 1, wherein the organic optical component exhibits an optical loss of less than 2.0 dB.cm−1 at at least one wavelength in the range 300 to 1600 nm.

8. A method as in claim 1, further comprising: supporting the first layer of an optically transmissive first polymer with a substrate, and removing the substrate from the first layer after said curing the resin filling the at least one retaining feature.

9. A method as in claim 8, further comprising replacing the removed flexible dispensing layer with a laminated film.

10. A method as in claim 1, further comprising: delaminating the flexible dispensing layer and removing the flexible dispensing layer.

* * * * *